McPHETRES & GROSS.
Corn Sheller.
No. 79,675.
Patented July 7, 1868.
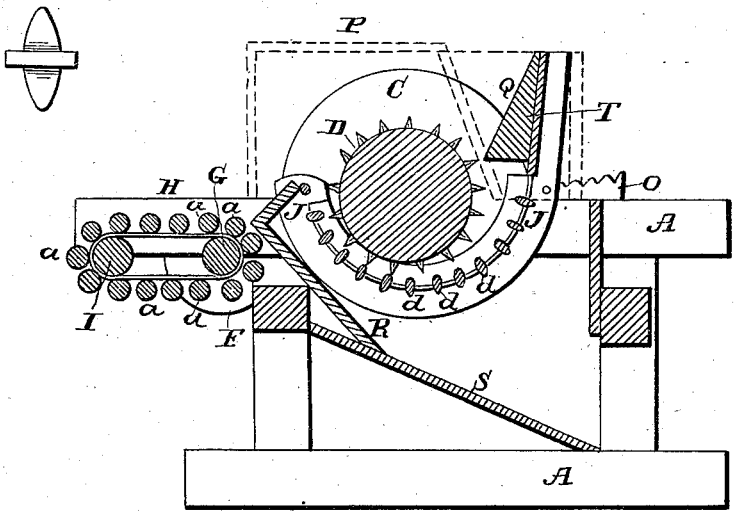
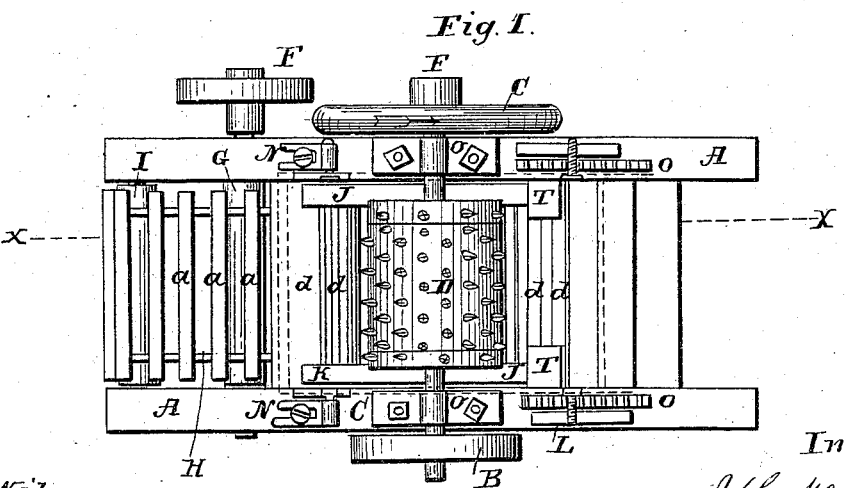

United States Patent Office.

JOSEPH H. McPHEETERS AND PHILIP P. GROSS, OF PALMYRA, MISSOURI.

Letters Patent No. 79,675, dated July 7, 1868.

IMPROVEMENT IN CORN-SHELLER.

*The Schedule referred to in these Letters Patent and making part of the same.*

TO ALL WHOM IT MAY CONCERN:

Be it known that we, JOSEPH H. McPHEETERS and PHILIP P. GROSS, both of Palmyra, Marion county, Missouri, have invented certain new and useful Improvements in Corn-Shelling Machines; and we hereby declare the following to be a full, and accurate description thereof, reference being had to the accompanying drawings, forming part of this specification.

The nature of our invention consists in constructing a corn-sheller, provided with a cylinder, having short, pointed spikes or projections upon its surface, to revolve in a curved row or series of oval or flattened bars placed beneath it, the rounded edges of said bars being presented towards the cylinder, and parallel, or nearly parallel to its axis, so that the ears of corn, in passing between the revolving cylinder and the bars, will be turned over and over by the points on the cylinder, and the grain be taken off by contact with the edges of the bars and fall through between them, while the cob is carried forward by the cylinder-points and thrown out.

Also, in making the aforesaid bars with corresponding opposite edges, and arranging them in a bar-frame in such a manner that when one edge is damaged by wear, or otherwise, they may be reversed, and the other edge presented towards the cylinder, and those in such parts of the set as to be most exposed to wear may be made to change places with those less exposed.

Also, in supporting and holding the bar-frame upon serrated keys, and by slotted plates, so that its position relatively to the cylinder may be changed, and the space between the bars and the cylinder, on either side, or beneath, may be varied, as the size of the ears of corn or other circumstances may require.

And also, in combining with the aforementioned cylinder and adjustable bar-frame, an endless apron of rods or bars, as a cob-carrier.

In the accompanying drawings—

Figure 1 is a plan of our improved corn-sheller, and

Figure 2 a vertical section of the same at the line $x\,x$ of fig. 1.

A strong frame, A A, supports the shelling-machinery, B being a pulley, to which driving-power may be applied. C, a fly-wheel, to give a more uniform motion to the cylinder D and the pulley E, on the same shaft, to be connected to the pulley F by a crossed belt, gives a proper motion to the cylinder G, and by it to the endless apron or cob-carrier H, composed of the bars or rods $a\,a$, connected together by the straps or belts $b\,b$, revolving on the cylinders or rollers G and I.

The cylinder D may be cast in three pieces, the middle part or shell, and the two ends, and be held together by bolts, or may be constructed in such other manner as may be preferred. It is provided with projecting points, as shown in the drawings, and its shaft turns in boxes supported by the frame A, and prevented from being lifted when in operation by the plates $c\,c$, bolted down to the frame.

The shelling-bars $d\,d$ are flattened, and have their rounded edges presented towards the cylinder D, their ends being flattened in a direction at right angles to that in which the middle part is flattened, so that they may pass down in grooves provided for that purpose in the curved bar-frame J J, the ends being of such width that in resting against each other the parts may be kept a proper distance apart, or so as to allow the grain to drop through freely without the cobs.

Figure 3 is an end view of one of the shelling-bars, (enlarged,) showing the rounded edges above and below the flattened end that is to be inserted in the groove of the frame.

By this arrangement the edge of any bar presented to the cylinder can be readily changed, and bars transferred from one part of the frame to another, so as to expose the different edges and different bars to about equal wear.

The two sides of the bar-frame J J are secured upon the bars, and supported by the screw-bolts or rods K and L. To remove or insert the bars, the nuts on those rods should be loosened as much as may be found necessary or convenient. The rod K is held by eyes in the slotted plates N N on the frame A, so that by loosening the screws which pass through the slots and hold the plates on the frame, the rod may be adjusted to different positions upon the frame, and the bar-frame moved along together with it; while the rod L, resting in notches upon the keys O O, may be raised or lowered by changing the position of the tapering keys. This arrangement enables us to adjust the bar-frame and bars in their position relatively to the cylinder D, and to vary the space between the cylinder and the bars at the sides or beneath, as the size of the ears of corn or other circumstances may require.

The cover P, and the hopper Q, formed by it in conjunction with the upward projection of the bar-frame, rest upon the frame A as shown by dotted lines.

The machine being set in motion, and the ears of corn to be shelled placed in the hopper, they descend between the cylinder and the bars, and being caught by the points on the cylinder, are turned over and over in contact with the bars where they approach the cylinder, and thus the grain is taken off the cob, and passes down between the bars, while the cobs are carried forward by the cylinder-points and thrown out upon the cob-carrier H, by which they are conveyed away to such a distance as may be convenient or desirable. The shelled corn falling upon the inclined planes S and R, runs down into a bin, or such other receptacle as may be provided for it.

The guides T T are wedge-shaped pieces, placed within the hopper, one at each side, to turn the ears of corn away from the ends of the cylinder, in order that when they reach the cylinder or bars they may be free to turn and arrange themselves parallel to the axis of the cylinder or to the bars. It is obvious that the form and construction of these guides may be considerably varied and yet produce the effect described.

Having thus described the construction and operation of a corn-sheller with our improvements, what we claim, and desire to secure by Letters Patent, is—

1. Making the shelling-bars flattened, with rounded edges, or flat oval in a cross-section, substantially as described.

2. Making the shelling-bars with corresponding opposite edges, and arranging them in such a manner that the edge of any bar presented towards the cylinder, or the place of the bar in the bar-frame, may be readily changed, substantially as described, and for the purposes set forth.

3. Making the bar-frame adjustable in its position relatively to the cylinder D, substantially in the mode and for the purposes described.

4. In combination with the cylinder D and adjustable bar-frame J J, we claim the endless apron or cob-carrier H.

5. We also claim the guides T T, substantially as and for the purposes described.

JOSEPH H. McPHEETERS,
PHILIP P. GROSS.

Witnesses:
   A. D. SPRAGUE,
   GRANVILLE KELLER.